May 5, 1953  J. G. ASTON ET AL  2,637,749
PROCESS FOR PURIFICATION OF CYCLOHEXANE
Filed Dec. 28, 1948                                        2 SHEETS—SHEET 1

INVENTOR.
J.G. ASTON
R.E. BLACK
BY Hudson & Young
ATTORNEYS

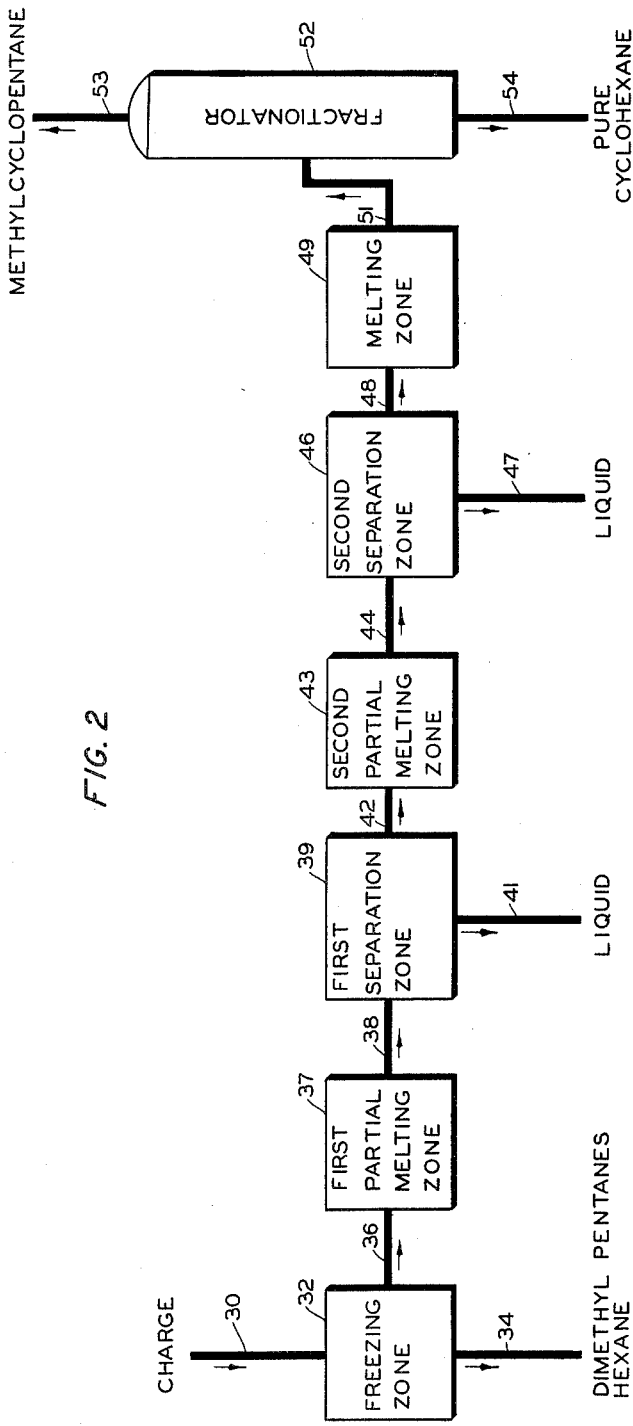

Patented May 5, 1953

2,637,749

UNITED STATES PATENT OFFICE 2,637,749

PROCESS FOR PURIFICATION OF CYCLOHEXANE

John G. Aston, State College, Pa., and Rodney E. Black, Sioux City, Iowa, assignors to Phillips Petroleum Company, a corporation of Delaware Application December 28, 1948, Serial No. 67,672

9 Claims. (Cl. 260—666)

This invention relates to a method of preparing pure compounds. In a more specific aspect, it relates to a method of separating organic compounds which are not decomposed by melting. In another aspect, it relates to a method of separating the components of a mixture of organic compounds which form solid solutions on freezing. In another specific aspect, it relates to a method of preparing pure hydrocarbons from mixtures of hydrocarbons. In another specific aspect, it relates to a method of separating cyclohexane from a hydrocarbon mixture containing cyclohexane and other components having boiling points close to that of cyclohexane. In still another specific aspect, it relates to an apparatus for carrying out such separations.

In the preparation of pure organic compounds, it is usually necessary to separate the desired compound from others with which it is present in a mixture. The process for making the separation depends on the components present and no one method is universally applicable. Commonly used processes include physical processes, such as distillation, extraction, and crystallization. Other physical as well as chemical processes are applicable and those skilled in the art can devise combinations of known processes.

Probably the most common process for resolving a mixture of organic compounds into its components is fractional distillation. However, if the boiling points of the components are close, it may be impossible to effect a separation by fractional distillation. Also, some compounds cannot be distilled because they are decomposed by the heat.

Crystallization or fractional crystallization processes may sometimes be employed, especially if the freezing points of the components are widely separated. This method may be complicated by the formation of solid solutions on freezing or by the presence of eutectic mixtures. Even in the simple case where the desired compound can be caused to crystallize from a mixture without the formation of mixed crystals or eutectic mixtures, such crystals will usually be contaminated by occluded or entrapped impurities. Removal of these impurities is usually effected by washing, squeezing or centrifuging or by melting and recrystallization.

Sometimes the desired compound will not freeze out as pure crystals but forms mixed crystals or a solid solution with another component present in the mixture. In a typical binary system of such components, if a portion only of the mixture is frozen, the composition of the mother liquor will not be the same as that of the solid with which it is in equilibrium, the ratios of the two components in the liquid and the solid being different. It is possible to effect separation of such mixtures by crystallizing a portion of the mixture, separating the solid and liquid phases, melting the solid, recrystallizing a portion of the melt and separating the solid from the liquid phase. This process may be repeated as many times as the circumstances require to produce a pure compound but the yield is quite low.

Eutectic mixture cannot be separated by ordinary crystallization methods. However, if one of the components is present in excess of the eutectic ratio, the separation of the excess of that component may be affected by the previously described methods, in which case, the "impurity" is the eutectic composition.

We have discovered a fractional fusion method of separation whereby greatly improved yields of the desired product are obtainable, and whereby it is possible to make separations which were impossible by previously known methods. This method of fractional fusion is applicable to systems composed of mixtures of compounds from which the desired component can be crystallized either as pure or mixed crystals provided, however, that if the desired component forms a eutectic with another, such desired component must be present in a ratio greater than the eutectic ratio. Our method is applicable to systems whose components are not decomposed by melting, and is particularly useful in effecting the separation of mixtures of low-boiling hydrocarbons which cannot be separated by distillation.

It is, therefore, an object of this invention to provide a method of separating compounds in a pure state from mixtures containing them.

It is another object of this invention to provide a method of separating low-boiling hydrocarbons from mixtures containing said hydrocarbons.

It is another object to provide an apparatus for carrying out such separations.

It is another object of this invention to provide a method of separating in substantially pure state, the components of a solid solution.

It is another object of this invention to provide a method for preparing pure cyclohexane.

Various other objects and advantages of our invention will be apparent to those skilled in the art upon reading the following detailed description, drawings and claims.

In the drawings,

Figure 2 is a flow sheet showing the various stages through which a feed material, such as a refinery stream, may be passed in the preparation of pure cyclohexane.

Figure 1:
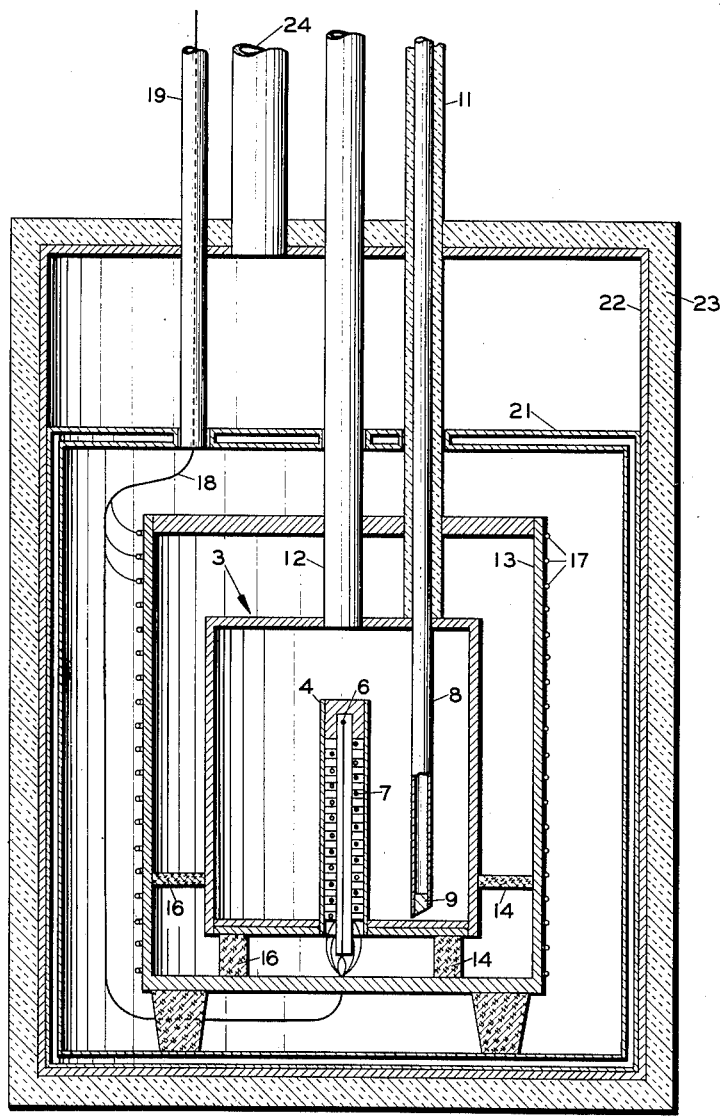
Figure 1 is a cross sectional view of an apparatus adapted to the carrying out of our invention.

In Figure 1, a sample container, generally designated as 3, is shown having a heater well 4 extending upward therein, inside of which well is a thermocouple 6 and a calorimeter heater 7. Liquid removal tube 8 having a porous plug 9 in its lower end extends from the bottom of sample container 3 upward to the outside. Tube 8 is provided with insulation 11 from the point where it leaves sample container 3 to the sample receiver, not shown. Filling tube 12 enters sample can 3 in an upper portion and extends upward to the outside for introducing material into said sample can. The sample can is positioned inside an outer heater shield 13, by means of spacer supports 14 and 16. Heating coils 17 are wrapped around heater shield 13 and connected to electricity lead line 18 which enters the apparatus through a tube 19. Surrounding the sample container and heater is a radiation shield 21, outside of which is a metallic cryostat can 22 which is covered by insulation 23. Opening into the cryostat can is a tube 24, which leads to a vacuum pump, not shown, for evacuating the apparatus.

In Figure 2, the charge stock is introduced into a first freezing zone 32 through feed line 30. The fraction of liquid remaining after the initial freezing is removed through line 34 and the solid is removed through line 36 to the first partial melting zone 37. The partially melted material is conveyed through line 38 into a first separation zone 39 where the liquid is separated and removed from the system through line 41, while the solid is moved through line 42 to a second partial melting zone 43. The partially melted material is transferred through line 44 to a second separation zone 46 where the liquid is separated and removed from the system through line 47, while the solid is transferred through line 48 to a melting zone 49. The melted material from zone 49 is transferred through line 51 to a fractionator 52, where the remaining traces of impurities such as methylcyclopentane, are removed as an overhead product through line 53 while the pure cyclohexane is removed as a kettle product through line 54.

OPERATION

In the preparation of pure hydrocarbons, such as cyclohexane, it is ordinarily preferable to take advantage of differences in boiling points and make the separation by fractional distillation. However, it is not always possible to make complete separations by distillation, even if the difference in boiling points is considerable because certain components form azeotropes or constant-boiling mixtures with certain others. Even if there is no azeotrope formation, it is practically impossible to effect complete separation when the difference in boiling points is only a few degrees.

In the practicing of our invention, a starting material containing the desired compound is first cooled to a temperature low enough to freeze a substantial portion of the desired component but not to the eutectic temperature if a eutectic is formed. This component may crystallize as either pure or mixed crystals, but in either case, the solid will contain impurities. While it is preferable to carry out the entire process in a single container, the starting material may be frozen and transferred to the separator. A vessel suitable for carrying out our method of separation is an adiabatic calorimeter such as shown in Figure 1. All or only a portion of the mass may be solidified, depending on the starting composition. Any liquid remaining may be removed from the solid phase by filtering or other suitable means. We use a tube extending into the container having its lower end closed by a porous plug. The initial freezing is usually accomplished in an atmosphere of inert gas, preferably helium, but after this freezing, the container is evacuated for the remainder of the operation. After removal of the liquid from the container, sufficient heat is added to melt a small portion, 10 to 20 per cent normally, of the remaining solid after which the influx of heat is stopped. The solid and liquid phase are allowed to remain in mutual contact under adiabatic conditions until substantial phase equilibrium is reached, which is indicated by a constant temperature. The liquid is removed from the solid by any suitable means, as previously disclosed. In the first partial melting step only a portion of the solid is melted, the exact amount depending on the amount of impurity present and the purity desired for the final product. For impurities of 3 or 4 mol per cent, about 10 per cent of the solid is usually melted. After the liquid has been removed, the solid is subjected to a second partial melting step and the liquid and solid phases are allowed to remain in mutual contact under adiabatic conditions until substantial phase equilibrium is reached, as in the first step. The liquid is then removed, leaving behind, a solid material richer in the relatively less fusible component than is the liquid. This may be continued until a pure sample is obtained, which will be indicated by an equilibrium temperature the same as the melting point of the pure material.

The number of stages through which the material must pass is determined by the specific system. If the desired component freezes as pure crystals, it is theoretically possible to make a perfect separation by only one partial melting. However, because of occluded impurities in the crystals, at least one fractional fusion is necessary. In the case of solid solutions, if there is a wide spread between the liquid and solid compositions in equilibrium, fewer fractional fusion stages are required than in a system wherein the spread is small.

The important step in the method and the one wherein applicants' invention resides is the partial melting brought about by the addition of heat followed by stopping the influx of heat and allowing the system to equilibrate adiabatically. To our knowledge, this feature has never been used or disclosed nor its advantages even realized by anyone before. Certainly, it makes possible the conversion of a moderately pure material to one of a very high purity in a single operation and in a short period of time in comparison with separations effected by conventional distillation processes.

On careful consideration of applicants' method, it is obvious that it will produce improved yields over other methods. It is known that the melting point of organic compounds is affected by the presence of impurities contained in the crystals either by admixture or occlusion. If these crystals are partially melted, there must be some adjustment of the crystal composition for the solid and liquid to establish equilibrium. The liquid within the crystals must flow outward from the interior. This contacts the remaining solid and is comparable to a small stream of fluid of increasing purity. Thus, each crystal sets up its own internal reflux system.

Fractional crystallization, as ordinarily practiced, is very inefficient and its use is limited. Hydrocarbon systems which tend to form glasses on freezing cannot be handled by ordinary crystallization methods, whereas they are handled very readily by our fractional fusion method.

Our invention is simple, efficient and applicable to a wide range of materials as compared with fractional crystallization methods.

By allowing the system to equilibrate adiabatically, the chance of localized overheating is removed and a uniform temperature is attained throughout the crystals. The presence of impurities inside the crystals lowers their melting point and since the amount of heat added is insufficient to melt the crystals entirely, there must be a change in the solid that remains in equilibrium with the melt so that the new solid and liquid are in equilibrium at a temperature above that prior to the addition of the heat. This necessarily results in a solid of higher purity than the original crystals, whether the original impurity was present by occlusion or as a component of a solid solution.

As a specific example, our method has been used in the separation of substantially pure cyclohexane from a refinery stream, which stream would normally contain cyclohexane, methylcyclopentane, n-hexane, 3-methylhexane and two dimethylpentane isomers. The first freezing separates substantially all of the cyclohexane together with a considerable amount of methylcyclopentane as mixed crystals. These mixed crystals are subjected to a series of fractional fusion steps to produce pure cyclohexane.

The advantages of our invention will be more fully appreciated from a study of the following examples.

EXAMPLE I

The efficiency of our fractional melting process can be illustrated by the results obtained in the separation of cis- and trans-butene-2. To appreciate the complexity of the separation problem, it must be realized that the composition of the eutectic between these two hydrocarbons is 85.7 mol per cent cis-butene-2 with a corresponding eutectic temperature of $-142°$ C., which temperature is only three degrees below the melting point of cis-butene-2. In spite of these serious limitations, starting with a mixture containing 96 mol per cent cis-butene-2, a 50 per cent yield of 99.99 per cent cis-butene-2 was obtained by using one fractional fusion method. This yield was 70 per cent of the theoretical maximum. Numerous previous attempts to purify a sample of the original material by fractional crystallization methods had completely failed.

EXAMPLE II

Similarly, a 99.996 per cent pure n-heptane sample was prepared by our method with a 70 per cent yield. The initial 500 cc. sample was 99.5 mol per cent n-heptane. The data for the separation were as follows:

| Liquid Withdrawn, cc. | Equilibrium Temperature, °K. | Purity of Remaining Sample, mol percent | Yield, percent |
|---|---|---|---|
| 0 | 182.108 | 99.5 | 100 |
| 50 | 182.498 | 99.91 | 90 |
| 100 | 182.514 | 99.92 | 80 |
| 150 | 182.577 | 99.996 | 70 |

EXAMPLE III

The feed stream used in this example is a refinery stream fraction having a composition as shown in the following table:

Table 1

|  | B. P., °C. | M. P., °C. | Mol Per cent Present |
|---|---|---|---|
| Cyclohexane | 80.74 | 6.68 | 70–90 |
| Methylcyclopentane | 71.81 | −142.44 | 1–15 |
| 2,4-Dimethylpentane | 80.51 | −119.23 | 6 |
| 2,2-Dimethylpentane | 79.2 | −123.8 | 3 |
| 3-Methylhexane | 91.9 |  | 3 |
| n-Hexane | 68.74 | −95.3 | 1 |

Inspection of the composition shows that at least three of the components present could not be separated by fractional distillation and it would be difficult to make a complete separation of cyclohexane from the remaining components. One might be led to believe, from an inspection of the above table, that cyclohexane could be separated from the remaining components in a pure state by a crystallization process. However, this cannot be accomplished because cyclohexane and methylcyclopentane separate from this mixture in the form of a solid solution. Since methylcyclopentane cannot be separated from cyclohexane in ordinary distillation equipment and since the two form solid solutions when separation is attempted by crystallization, it is necessary that another process be devised for effecting their separation.

In the freezing zone, the charge of crude cyclohexane is cooled to a temperature between the freezing point of cyclohexane and the eutectic temperature for the components present but preferably between $-10°$ C. and $-60°$ C., by suitable means, for example, a Votator machine or other cooling and stirring device. At this temperature, substantially all the cyclohexane solidifies and some methylcyclopentane crystallizes with the cyclohexane in the form of a solid solution. The dimethyl pentanes and other paraffinic materials remain liquid at this freezing temperature and are removed by filtering or centrifuging. The solid mass is passed to the first partial melting zone where the temperature is raised to the melting point of the cyclohexane-methylcyclopentane solid solution of the composition present and where from 1 to 10 per cent of the solid is melted. The liquid-solid mixture is then passed into the first separation zone where the liquid is removed from the solid crystals by suitable means such as filtering or centrifuging. The crystals are passed through the second partial melting zone where from 1 to 20 per cent of the charge is melted and into the second separation zone where the liquid is removed. The fraction of the crystals melted in each case will depend on the desired purity and yield of the product. The lower percentages of mixture melted result in higher yields of a less pure product while the high percentages of material melted result in lower yields of a high purity product. The crystalline mass from the second separation zone is passed to a melting zone in which the solid is melted by applying heat. The liquefied cyclohexane is then charged to an efficient fractionating column in which the methylcyclopentane is removed overhead and the substantially pure cyclohexane is obtained as a kettle product.

EXAMPLE IV

The results of preparing other samples were as indicated in the following table:

| Sample | Apparatus Used | Original Purity, Mol Percent | Final Purity, Mol Percent * | Yield | |
|---|---|---|---|---|---|
| | | | | Actual | Possible |
| | | | | Percent | Percent |
| Cis-Butene-2 | 1 | 96 | 99.99 | 40 | 50 |
| Trans-Pentene-2 | 2 | 95+3 | 99.9 | 33 | 60 |
| 2,2,4-Trimethylpentane | 1 | 99.6 | 99.988 | 44 | 67 |
| n-Heptane | 1 | 99.4 | 99.994 | 44 | 78 |
| Do | 3 | 99.5 | 99.99 | 60 | 70 |
| 2,2,4-Trimethylpentane | 3 | 99.7 | 99.99 | 60 | 80 |
| n-Heptane | 4 | 99.6 | 99.99 | 65 | 74 |

* From fractional melting data.

The yield indicated in column 4 above is that actually obtained for the sample purified. If a second sample were to be processed, on the basis of information obtained in the first run, the estimated yield which would be possible is given in column 5.

It is obvious that our method may be used in the separation of other compounds, both organic and inorganic, which do not decompose on melting and is not limited to the specific examples described. The various examples are given by way of illustration and the invention is not to be considered as limited thereby but is limited only by the following claims.

Having described our invention, we claim:

1. A method of preparing in a pure state at least one component of a multi-component mixture of organic compounds which are not decomposed by melting and which freezes as a solid solution, which comprises the steps of freezing a sufficient amount of the mixture to obtain a substantial portion of the desired component as a solid, subjecting the solid to at least one fractional fusion step in which sufficient heat is added to melt a portion of the solid, holding resulting solid and liquid phases in mutual contact under adiabatic conditions until phase equilibrium is attained, and withdrawing the resulting liquid to leave the desired pure product.

2. A method of purifying at least one component of a two component, low-boiling hydrocarbon mixture which freezes as a solid solution which comprises the steps of freezing the mixture as a solid solution, melting from one to ten per cent of said solid and maintaining the liquid and solid phases in mutual contact under adiabatic conditions until phase equilibrium is attained, separating the liquid from the solid, melting from one to twenty per cent of the remaining solid and maintaining the liquid and solid phases in mutual contact under adiabatic conditions until equilibrium is attained, and separating the liquid from the purified solid.

3. A method of recovering purified cyclohexane from a mixture of hydrocarbons containing cyclohexane and other close boiling components which comprises the steps of cooling the mixture to cause a substantial part of the cyclohexane to crystallize, separating the solid and liquid phases, partially melting the solid and attaining equilibrium of the liquid and solid phases under adiabatic conditions, removing the liquid, again partially melting the solid and attaining substantial equilibrium of the solid and liquid phases under substantially adiabatic conditions, removing the liquid, melting the remaining solid and distilling said melted solid to remove any remaining impurities and leave the purified cyclohexane as a kettle product.

4. A method of separating purified cyclohexane from a hydrocarbon mixture containing cyclohexane, dimethylpentanes and methylcyclopentane which comprises the steps of lowering the temperature of said mixture until substantially all of the cyclohexane has been crystallized, separating the liquid from the solid, partially melting the separated solid and attaining equilibrium of the solid and liquid phases under adiabatic conditions, separating the solid and liquid, partially melting the remaining solid and attaining equilibrium of the liquid and solid under adiabatic conditions, separating the solid and liquid phases, completely melting the remaining solid, passing the liquid into a fractionation zone, removing the final traces of methylcyclopentane in the overhead stream, and removing the purified cyclohexane as a kettle product.

5. A method of separating pure cyclohexane from a hydrocarbon mixture containing cyclohexane, methylcyclopentane, and dimethylpentanes which comprises the steps of lowering the temperature of said mixture to crystallize a substantial portion of the cyclohexane without crystallizing the dimethylpentanes, separating the liquid phase from the solid phase which contains the cyclohexane and methylcyclopentane in solid solution, subjecting the solid to a series of consecutive fractional fusion steps, in each of said fractional fusion steps equilibrating resulting solid and liquid phases under adiabatic conditions, and removing the liquid phase each time, melting the remaining solid and passing it into a fractionation zone, removing a methylcyclopentane-containing fraction as an overhead, and removing the substantially pure cyclohexane as a kettle product.

6. A method of separating pure cyclohexane from a refinery stream fraction containing cyclohexane and methylcyclopentane which comprises the steps of cooling the cyclohexane-containing fraction to a temperature between —10° C. and —60° C. to freeze a substantial portion of the cyclohexane as a solid solution of cyclohexane and methylcyclopentane, separating the solid and liquid phases, adding sufficient heat to melt from one to ten per cent of said solid, stopping the influx of heat, and maintaining the liquid and solid phases in mutual contact under adiabatic conditions until equilibrium is attained, separating the liquid from the solid, adding sufficient heat to melt from one to twenty per cent of the remaining solid, stopping the influx of heat, and maintaining the liquid and solid phases in mutual contact under adiabatic conditions until equilibrium is attained, separating the liquid from the solid, melting the remaining solid and passing the melt into a fractionating tower, removing an impure stream overhead and leaving pure cyclohexane as a kettle product.

7. A method of separating pure cyclohexane from a hydrocarbon mixture containing cyclohexane, methylcyclopentane and other close-boiling compounds which comprises the steps of cooling of the mixture to a temperature between $-10°$ C. and $-60°$ C. to crystallize a substantial portion of the cyclohexane as a solid solution with methylcyclopentane, removing the solid phase, subjecting the solid to a series of consecutive fractional fushion steps in which sufficient heat is added to melt from one to twenty per cent of the solid, in each of said fractional fusion steps equilibrating the solid and liquid phases under adiabatic conditions after which the liquid phase is removed in each step, melting the final solid phase and passing the melt into a fractionation zone, removing final traces of impurities as an overhead stream and producing pure cyclohexane as a kettle product.

8. A method of recovering pure cyclohexane from a refinery stream containing cyclohexane, methylcyclopentane and close-boiling similar components which comprises separating the cyclohexane and methylcyclopentane from the other components by cooling the mixture to a temperature at which a substantial portion of the methylcyclopentane freezes but above the temperature at which the other components freeze, separating the solid and liquid phases, melting a portion of said solid, maintaining the liquid and solid phases in mutual contact under adiabatic conditions until equilibrium is attained, separating the solid and liquid phases, melting a portion of said solid and maintaining the solid and liquid in mutual contact under adiabatic conditions until equilibrium is attained, separating the solid and liquid phases, melting said solid and charging the melt into a fractionation zone, removing any remaining impurities as an overhead product and recovering the purified cyclohexane as a kettle product.

9. A method of purifying at least one component of a two-component, low-boiling hydrocarbon mixture which freezes as a solid solution which comprises the steps of freezing the mixture as a solid solution, melting a minor amount of said solid and maintaining the liquid and solid phases in mutual contact under adiabatic conditions until phase equilibrium is attained, separating the liquid from the solid, melting a minor amount of the remaining solid and maintaining the liquid and solid phases in mutual contact under adiabatic conditions until equilibrium is attained, and separating the liquid from the purified solid.

JOHN G. ASTON.
RODNEY E. BLACK.

References Cited in the file of this patent

UNITED STATES PATENTS

| Number | Name | Date |
|---|---|---|
| 1,610,307 | Nash | Dec. 14, 1926 |
| 2,034,681 | Martin | Mar. 17, 1936 |
| 2,385,543 | Ross et al. | Sept. 25, 1945 |
| 2,398,526 | Greenburg | Apr. 16, 1946 |
| 2,435,792 | McArdle et al. | Feb. 10, 1948 |
| 2,470,116 | Swietoslawski et al. | May 17, 1949 |

OTHER REFERENCES

Bogue: "The Chemistry of Portland Cement," Reinhold, N. Y., publisher, received July 14, 1947, page 207.